(12) United States Patent
Noy et al.

(10) Patent No.: US 11,816,914 B2
(45) Date of Patent: Nov. 14, 2023

(54) MODULAR PREDICTIONS FOR COMPLEX HUMAN BEHAVIORS

(71) Applicant: Humanising Autonomy Limited, London (GB)

(72) Inventors: Dominic Noy, London (GB); Matthew Cameron Angus, London (GB); James Over Everard, London (GB); Wassim El Youssoufi, London (GB); Raunaq Bose, London (GB); Leslie Cees Nooteboom, London (GB); Maya Audrey Lara Pindeus, London (GB)

(73) Assignee: HUMANISING AUTONOMY LIMITED, London (GB)

( * ) Notice: Subject to any disclaimer, the term of this patent is extended or adjusted under 35 U.S.C. 154(b) by 338 days.

(21) Appl. No.: 17/011,854

(22) Filed: Sep. 3, 2020

(65) Prior Publication Data
US 2021/0070322 A1  Mar. 11, 2021

Related U.S. Application Data

(60) Provisional application No. 62/896,487, filed on Sep. 5, 2019.

(51) Int. Cl.
*G06V 40/00* (2022.01)
*G06V 40/10* (2022.01)
(Continued)

(52) U.S. Cl.
CPC ....... *G06V 40/103* (2022.01); *B60W 60/0027* (2020.02); *G06F 18/295* (2023.01);
(Continued)

(58) Field of Classification Search
CPC ...... B60W 60/0027; B60W 2554/4046; G06V 20/58; G06K 9/6297; G06N 3/08; G06N 7/005
See application file for complete search history.

(56) References Cited

U.S. PATENT DOCUMENTS 11,436,537 B2 * 9/2022 Jaenisch ............... G06N 20/20
2008/0312833 A1   12/2008 Greene et al.
(Continued)

OTHER PUBLICATIONS

A. Rasouli and J. K. Tsotsos, "Autonomous Vehicles That Interact With Pedestrians: A Survey of Theory and Practice," Mar. 2019 (Year: 2019).*
(Continued)

*Primary Examiner* — Russell Frejd
*Assistant Examiner* — Brittany Renee Peko
(74) *Attorney, Agent, or Firm* — FENWICK & WEST LLP

(57) ABSTRACT

A device performs operations including determining a probability that a vulnerable road user (VRU) will continue on a current path (e.g., in connection with controlling an autonomous vehicle). The device receives an image depicting a vulnerable road user (VRU). The device inputs at least a portion of the image into a model, and receives, as output from the model, a plurality of probabilities describing the VRU, each of the probabilities corresponding to a probability that the VRU is in a given state. The device determines, based on at least some of the plurality of probabilities, a probability that the VRU will exhibit a behavior, and outputs the probability that the VRU will exhibit the behavior to a control system.

20 Claims, 11 Drawing Sheets

(51) Int. Cl.
*B60W 60/00* (2020.01)
*G06N 3/08* (2023.01)
*G06V 20/58* (2022.01)
*G06F 18/20* (2023.01)
*G06N 7/01* (2023.01)
*G06V 10/764* (2022.01)
*G06V 10/82* (2022.01)
*G06V 20/56* (2022.01)

(52) U.S. Cl.
CPC .............. *G06N 3/08* (2013.01); *G06N 7/01* (2023.01); *G06V 10/764* (2022.01); *G06V 10/82* (2022.01); *G06V 20/56* (2022.01); *G06V 20/58* (2022.01); *B60W 2554/4046* (2020.02)

(56) References Cited

U.S. PATENT DOCUMENTS

| | | | |
|---|---|---|---|
| 2011/0246156 A1 | 10/2011 | Zecha et al. | |
| 2017/0057497 A1 | 3/2017 | Laur et al. | |
| 2018/0233048 A1* | 8/2018 | Andersson | G08G 1/166 |
| 2018/0326982 A1* | 11/2018 | Paris | B60W 30/0956 |
| 2019/0012574 A1 | 1/2019 | Anthony et al. | |
| 2019/0065939 A1* | 2/2019 | Bourgoin | G06N 3/0472 |
| 2019/0176820 A1 | 6/2019 | Pindeus et al. | |
| 2020/0247434 A1* | 8/2020 | Kim | B60W 60/00274 |
| 2020/0380273 A1* | 12/2020 | Saez | G06K 9/00805 |
| 2022/0153296 A1* | 5/2022 | Yu | B60W 60/0011 |
| 2022/0227367 A1* | 7/2022 | Kario | B60W 30/0956 |

OTHER PUBLICATIONS

D. Ridel, E. Rehder, M. Lauer, C. Stiller and D. Wolf, "A Literature Review on the Prediction of Pedestrian Behavior in Urban Scenarios," 2018 (Year: 2018).*

A. Arnab, "Conditional Random Fields Meet Deep Neural Networks for Semantic Segmentation" 2018 (Year: 2018).*

De Nicolao et al., "Onboard Sensor-Based Collision Risk Assessment to Improve Pedestrians' Safety,"*IEEE Transactions on Vehicular Technology*, IEEE Service Center, Piscataway, NJ, US, vol. 56, No. 5, Sep. 1, 2007 (Sep. 1, 2007), p. 2405-2413.

International Search Report and Written Opinion, Patent Cooperation Treaty Application No. PCT/IB2020/000713, dated Jan. 21, 2021, sixteen pages.

Kooij et al., "Context-Based Path Prediction for Targets with Switching Dynamics," *International Journal of Computer Vision*, vol. 127, No. 3, Jul. 2, 2018 (Jul. 2, 2018), p. 239-262.

* cited by examiner

MODULAR PREDICTIONS FOR COMPLEX HUMAN BEHAVIORS

CROSS REFERENCE TO RELATED APPLICATIONS

This application claims the benefit of U.S. Provisional Application No. 62/896,487, filed Sep. 5, 2019, which is incorporated by reference in its entirety.

BACKGROUND

Related art systems have attempted to predict whether a pedestrian will be endangered by an autonomous or semi-autonomous vehicle (e.g., by being within the vehicle's path). Some related art systems, in connection with these attempts, collect many video sequences of people ending up in the path of the vehicle and people not ending up in the path of the vehicle and analyze these video sequences to model whether such activity is likely to occur.

However, these models produce inexplicable results. End-to-end systems are black-box solutions that do not allow for a clear description of issues that might arise. This makes the software unreliable and prevents proper functional safety standardization. It is technologically challenging and economically expensive to generate or get access to such data. For example, from a technology perspective, such data in related art systems needs to be manually labeled in order to train deep learning models; related art systems are incapable of automatically labeling the data. From an economic perspective, the labeling is a labor-intensive process, which thus requires huge expense in hiring trained human beings to perform the labelling, and potentially adding discrepancies due to subjective labelling. Yet further, such models are prevented from tuning to domain shifts and different environments, as the entire model needs to be retrained on the appropriate data in which the technology is to be used.

SUMMARY

Systems and methods are disclosed herein for determining a probability that a vulnerable road user (VRU) will exhibit a behavior (e.g., continue on a current path (e.g., in connection with controlling an autonomous vehicle, become distracted, intend to cross a street, actually cross a street, become aware of a vehicle, and so on). In an embodiment, the system receives an image depicting a vulnerable road user (VRU), such as an image taken from a camera of a vehicle on a road. The system inputs at least a portion of the image into a model (e.g., a probabilistic graphical model or a machine learning model), and receives, as output from the model, a plurality of probabilities describing the VRU, each of the probabilities corresponding to a probability that the VRU is in a given state. The system determines, based on at least some of the plurality of probabilities, a probability that the VRU will exhibit the behavior (e.g., continue on the current path), and outputs the probability that the VRU will exhibit the behavior to a control system. The probability that the VRU will exhibit the behavior may depend, for example, on a determined level of distraction of the VRU.

Figure 1:
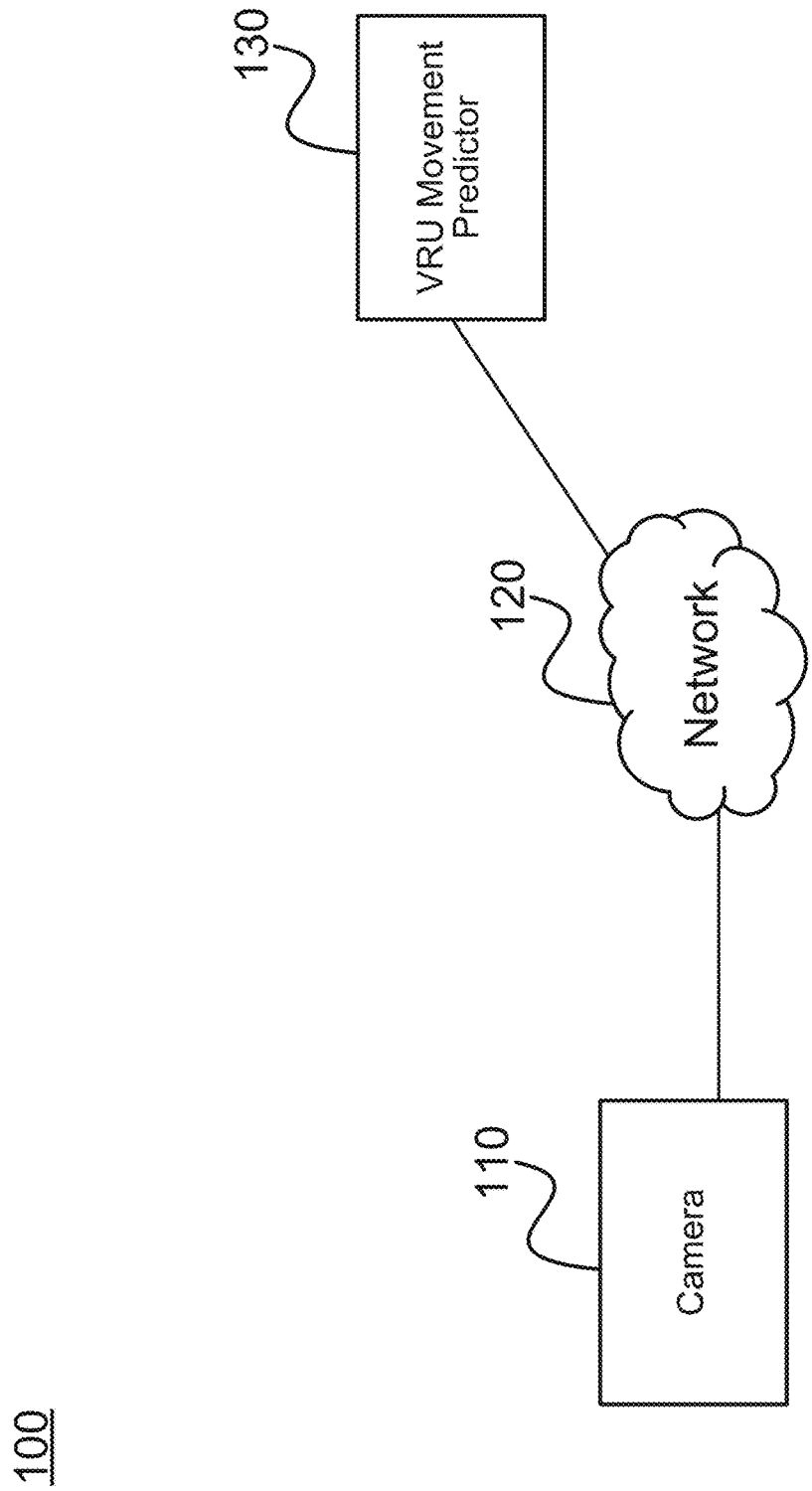
FIG. 1 depicts an exemplary system environment for a VRU movement predictor, in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Systems and methods are described herein that address shortcomings described in the background by determining probabilities that VRUs will exhibit a behavior (e.g., continue along a current path). For example, in the field of autonomous vehicles and semi-autonomous vehicles, these vehicles often make decisions as to whether to take actions (e.g., brake, honk horn, swerve, etc.) based on perceived pedestrian activity. Likelihoods that correspond to whether a VRU is going to depart from a current path inform whether a vehicle should act based on the trajectory of a VRU, or whether the vehicle should act based on a departure from that trajectory.

Moreover, embodiments disclosed herein go beyond determining whether a VRU is likely to exhibit the behavior (e.g., depart from a current path), but also extract uncertainty as to how likely it is for the determined probability to be accurate. This enables control systems of vehicles to decide whether to use, discard, or otherwise weight probability determinations depending on how confident the system is about the accuracy of the probability determinations. Related art systems have been unable to generate uncertainty determinations given technical challenges to doing so in traditional deep learning models. Uncertainty determinations provide additional technical advantages of making the models applicable to domain shifts.

Yet further, the uncertainty determinations are useful in aiding autonomous or semi-autonomous vehicles in passing regulations, such as government functional safety tests that require it to be shown how vehicles perform in challenging situations. The uncertainty value determination disclosed herein allow users to extract edge cases that offer clear explanations to where the software would struggle. The uncertainty values, for example, allow a vehicle control system to determine when to rely on the VRU prediction software and when not to. In such a situation the vehicle can decide to use an alternative sensor to perform the prediction, e.g., switching from a vision camera to a depth sensor such as Lidar. The control system can also determine to notify the fleet operator or driver of the vehicle to clean the sensors or perform maintenance on the vehicle. At the time of frequent uncertain predictions, the vehicle can signal that Over The Air updates and maintenance are required. These fallbacks and this additional information make for a far more reliable system that performs much better on functional safety tests.

The modular fashion at which these predictions are generated, allow for domain shifts to different sensor positions, sensor types, geographic locations (thus cultural behavior changes of VRU's), and even different industries. Thanks to the explainability and clear configuration of the models, one does not need to retrain the entire model to work for a new situation (as with end-to-end solutions), such as forming predictions where VRUs have different movement norms due to, for example, cultural differences. This is because the principles on which the prediction is made still holds, and only small aspects of the configuration will need tuning to take into account the domain changes.

With regard to edge cases, there are far fewer data samples of risky interactions between VRUs and vehicles than there are irrelevant interactions. A traditional deep learning model would require millions and millions of samples. The systems and methods disclosed herein, however, form accurate predictions with far fewer samples. Edge cases occur due to under-representation in the training dataset. So during evaluations, the model would output high uncertainty. This allows an administrator to correct the model before or during deployment of the model. Knowing when a prediction fails m Systems and methods are disclosed herein that use robust techniques that improve upon the related art systems for recognizing and predicting human (e.g., pedestrian) behavior, and thus improve upon safety and efficiency mechanisms in, e.g., autonomous vehicles. While these techniques are generally described for use in autonomous or semi-autonomous vehicles, application in related technologies is within the scope of the disclosure as well. Examples of related technologies include camera systems like static camera systems built into (or otherwise attached to) roadside infrastructure and buildings, that are not necessarily part of a vehicle. Other related technologies include robots (e.g., manufacturing robots which may need to predict human behavior in a factory environment to ensure human safety and delivery bots), drones, agricultural applications, home and office appliances, retail applications, IoT applications, and the like.

In some aspects of the disclosure, systems and methods are described herein where people's behavior is divided into separate features (e.g., by a processor executing one or more modules). Examples of features like this are 'where is the person looking at', and 'does the person have a phone in their hand'. To extract features like this, the systems and methods disclosed herein apply computer vision models such as 'gaze estimation', that allows the systems and methods to infer whether someone is looking at a vehicle when the gaze is aimed towards a vehicle or towards the camera, which in turn drives decisions as to whether the vehicle should alter or halt its heading based on risk of injuring the person. Further discussion of models, such as a multi-task model that trains different branches to determine different features based on images that include VRUs, is described in commonly-owned U.S. patent application Ser. No. 16/857,645, filed Apr. 24, 2020, the disclosure of which is hereby incorporated by reference herein in its entirety.

Combining multiple features together (e.g., gaze, phone use, etc.) allows the systems and methods to recognize higher level features such as 'distraction', or a 'risk for collision' index. The systems and methods disclosed herein achieve this combining of these features in an unbiased way. This unbiased fashion distinguishes from the related art systems described above, which at best combine features in a causal manner (e.g., if the person does not look at the vehicle and the person has a phone in their hand then the person is likely to cross). The unbiased determination of these various indices feeds into, e.g., the change of course of a vehicle, the alerting of an operator of a vehicle or other administrator, the alerting of a pedestrian (e.g., by causing a horn to sound), and the like.

The systems and methods disclosed herein achieve the combining of these features by, for example, using a Probabilistic Graphical Model (PGM) framework. It allows to merge symbolic probabilistic AI and Deep Learning. This distinguishes from the related art systems described above, by being able to capture very complex relations between variables which can be specified by the researcher. In addition, it is possible to obtain uncertainty estimates of the model prediction. For instance, by observational studies it is known that distracted persons are more prone to riskier crossing decisions. To predict crossing, the PGM can be used that directly relates a variable with a probability distribution that represents distraction to another variable with a probability distribution that represents crossing intention. Because these variables are not fixed, but a probability distribution, much more complex relationships can be captured and an uncertainty value can be extracted.

An exemplary disadvantage of the causal manner is that there is an oversimplification. How the features are related and the discretization of the individual features lead to a loss of precision, accuracy and missing information with which you can evaluate the performance of the individual features and their combination. This oversimplification leads to a reduction in the robustness of the models, which in turn prevents a vehicle from taking an optimal course of action.

Because of automated decision-making, the systems and methods disclosed herein can make more features and get more data, which leads to much more complex models that include continuous variables. Manual labelling of continuous variables is extremely difficult and laborious. Two approaches—"Deep Learning Approach" and "Probabilistic Graphical Models"—are described in further detail below that address the limitations of the related art systems, walk through this solution using the example of predicting whether someone will be in the path of the vehicle due to distraction. This is merely exemplary, and predicting any given behavior may be performed using the systems and methods disclosed herein, such as crossing intent, crossing warning, continuing a current path, distraction, awareness, and so on. While the approaches are described separately, a hybrid model is also described as part of the disclosure. The hybrid model combines deep learning models and probabilistic graphical models. A brief description of such an approach is a model in which the input are continuous and discrete variables (output by for example deep learning models), and the relations between those variables features is defined by expert knowledge using PGM. The conditional probability functions (e.g. the function describing the probability of whether someone is distracted or not, given their visual angle) in this model are approximated by neural networks.

To estimate the parameters of deep neural networks, one can minimize a loss function by using back propagation and gradient descent. The loss function can be derived from Maximum Likelihood Estimation (MLE) which would find the best fitting parameter value, given the data. The shortcoming of MLE is that it estimates single values. Often, those maximum estimates are far from the average of the underlying probability distribution, so that the result may be a non-optimal solution. In concrete, one might build a model that you believe to be the best fit but this might not be true. Another shortcoming of this approach is that the system may not have information about the uncertainty as measured by the width of the distribution of the model parameters.

In some embodiments, the systems and methods disclosed herein follow a Bayesian approach. This means that the systems and methods estimate the underlying distribution of the model parameters. An exemplary advantage of this is that the system obtains measures of uncertainty, even at test time (for new observations).

A backpropagation algorithm using gradient descent cannot achieve this outcome. One must use Markov Chain Monte Carlo and Variational Inference to estimate the posterior distributions over the model parameters. When using this approach for deep neural networks, this process is extremely slow and often does not converge because of the great number of parameters that are used for deep learning models. Therefore, it is not often applied, except for example variational auto-encoders. However, because the systems and methods described herein use smaller models (by using PGM with interpretable variables and relations between variables), the systems and methods can use the Bayesian approach and parameter learning and inference becomes quick and feasible.

Using those approaches has a range of benefits. For example, this allows the systems and methods to capture uncertainty, which is crucial for critical decision-making and safety systems—as the vehicle would know how much it can rely on our findings, or whether to rely on alternative sensors (e.g., Lidar). As another example, the systems and methods can discover edge cases and reduce bias more easily, without having to label millions of situations to capture all cases. Additionally, the software is much more interpretable, transparent and we would be able to understand when and why it fails. Moreover, the systems and methods allow one to tune the described models to new environments and additional applications much more quickly and reliably. This approach can be extended with neural networks, which gives one the best of both worlds—flexibility by using neural networks to find the best fitting function, and a Bayesian Network or Dynamic Bayesian Network to generate interpretability.

FIG. 1 depicts an exemplary system environment for a VRU movement predictor, in accordance with one embodiment. Environment 100 includes camera 110, network 120, and VRU movement predictor 130. Camera 110 captures images of VRUs and transmits the images via network 120 to VRU movement predictor 130. Camera 110 is typically operably coupled to a vehicle, such as an autonomous or semi-autonomous vehicle. The vehicle may be an automobile (that is, any powered four-wheeled or two-wheeled vehicle). Camera 110 may be integrated into the vehicle, or may be a standalone (e.g., dedicated camera) or integrated device (e.g., client device such as a smartphone mounted on vehicle). While only one camera 110 is depicted, any number of cameras may be operably coupled to the vehicle and may act independently (e.g., images are processed without regard to one another) or in concert (e.g., images may be captured in sync with one another and may be stitched together to capture wider views).

Network 120 may be any data network, such as the Internet. In some embodiments, Network 120 may be a local data connection to camera 110. For example, VRU movement predictor 130 may be installed on-board a vehicle where camera 110 is located, such as on a dedicated chip or device, or being co-installed on a client device or other processing circuitry with camera 110. VRU movement predictor 130 receives the images and determines therefrom probabilities that VRUs shown in the images are likely to exhibit a behavior. An example of the behavior being whether the VRU is likely to continue along a current path or not (e.g., continue moving along a sidewalk rather than jump into the road) is used throughout for illustrative purposes and convenience. However, this example is non-limiting, and in the place of discussions of whether a user is likely to continue along a current path, any other behavior exhibition may be predicted, such as an intent of a user to cross, a user actually crossing a street, a user becoming distracted, a user becoming aware of a vehicle, and so on. Details about how these probabilities are determined are described in further detail below with respect to FIGS. 2-11. In some embodiments, while not depicted, VRU movement predictor 130 transmits the predictions to a control system, where the control system takes action based on the predictions (e.g., alter a vehicle's movement or function, alert a vehicle operator, etc.).

Figure 2:
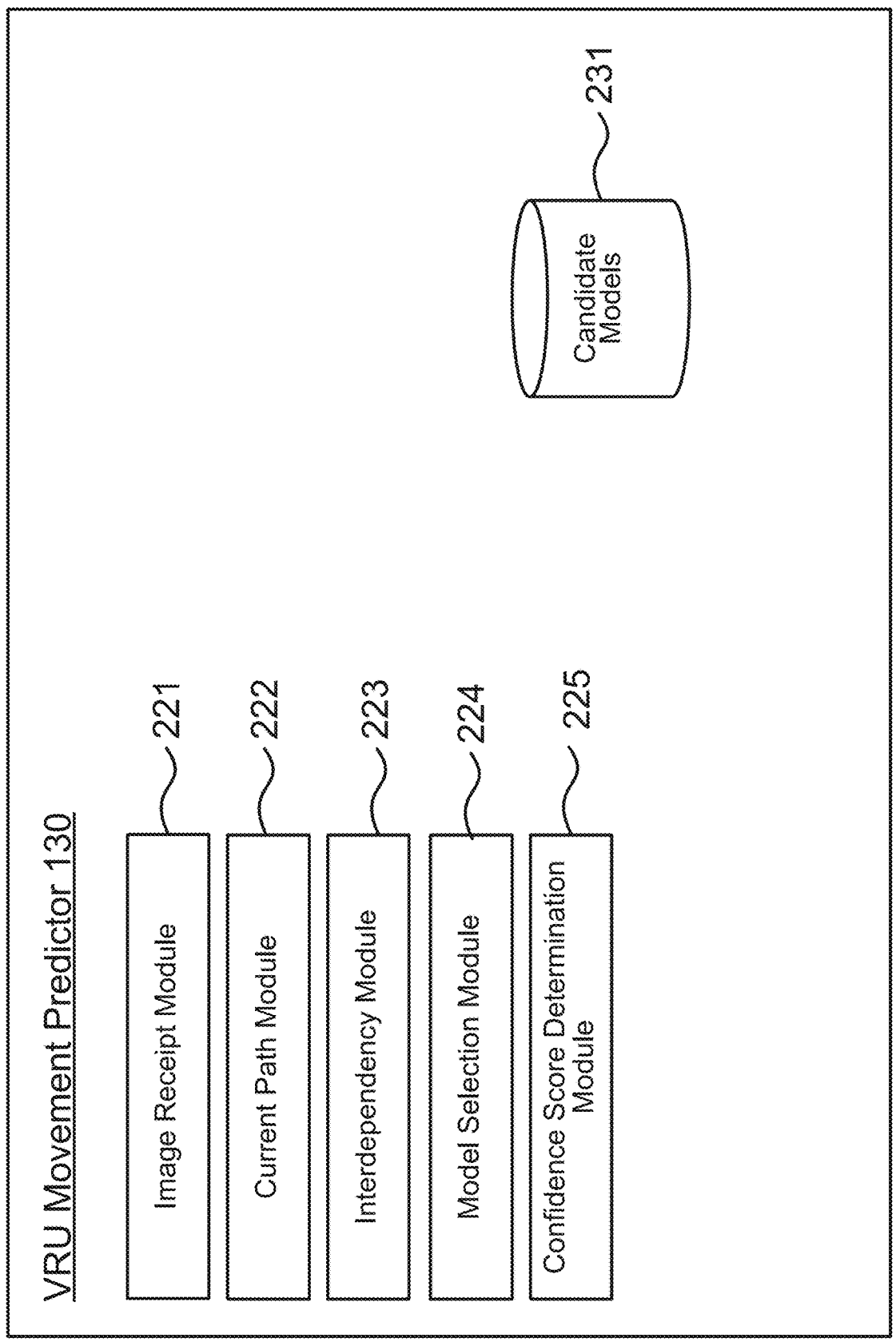
FIG. 2 depicts exemplary modules and databases of a VRU movement predictor, in accordance with one embodiment.

FIG. 2 depicts exemplary modules and databases of a VRU movement predictor, in accordance with one embodiment. As depicted in FIG. 2, VRU movement predictor 130 includes image receipt module 221, model selection module 222, distraction module 223, current path module 224, interdependency module 225, confidence score determination module 225, and candidate models 231. The modules and databases depicted in FIG. 2 are merely exemplary and used for convenience of illustration; more or fewer modules, and/or different modules, may be used to achieve any of the activity described herein.

Figure 3:
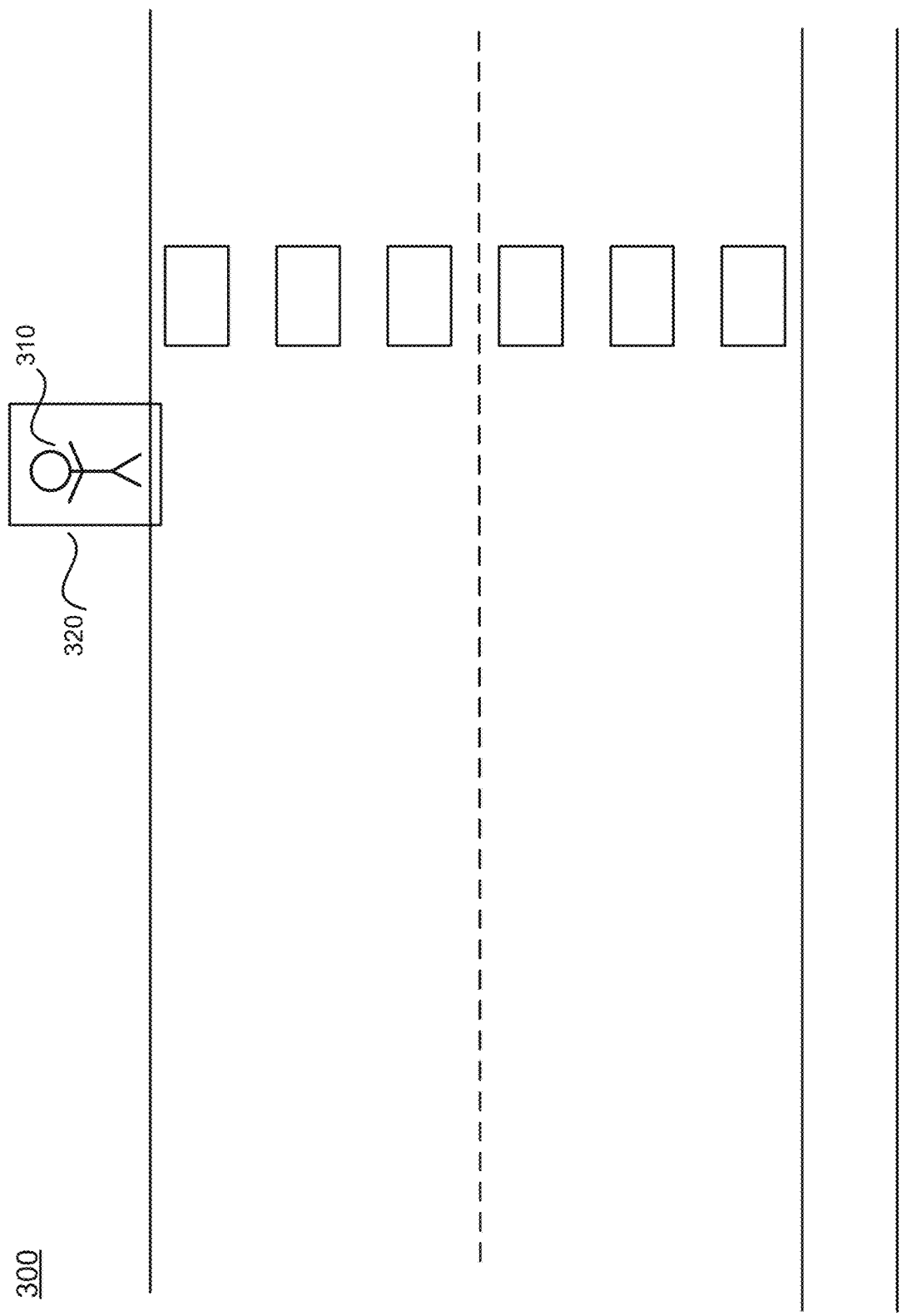
FIG. 3 depicts an exemplary embodiment of identifying a VRU in an image, in accordance with one embodiment.

Image receipt module 221 receives images from camera 110. In some embodiments, image receipt module 221 does not process the images after receipt. In some embodiments, image receipt module 221 processes the images after receipt (e.g., to isolate and/or identify one or more VRUs in the image and/or other features). This is further explained in FIG. 3, which will be briefly turned to here. FIG. 3 depicts an exemplary embodiment of identifying a VRU in an image, in accordance with one embodiment. Image 300 includes one or more VRUs 310. Image receipt module 221 may process the image by detecting the VRUs 310 in the images and applying bounding boxes 320 around those VRUs. As will be explained further below, the bounding boxes may be used as input to the model(s) instead of, or in addition to, the images themselves, thus saving on processing power and leading to more accurate model outputs by removing noise from the full images.

The received image (or a portion thereof, such as a bounding box), is then input into a model. Optionally, current path module 222 feeds the input into the model to determine a probability that the VRU is in a given state (e.g., distracted). Otherwise, current path module 222 feeds the input into the model to determine the probability that the VRU will exhibit a behavior (e.g., continue along a current path) with regard to features separate from, or in addition to, distraction. In some embodiments, the model that the image is input into may be a deep learning model or a probabilistic graphical model. The deep learning approach is explained first. The deep learning approach may use a multi-layer Recurrent Neural Networks (RNN) with Long Short Term Memory (LSTM) (+attentional mechanism). This is used for convenience in illustration with reference to FIG. 4, though any other neural network solution can be used in this approach.

Figure 4:
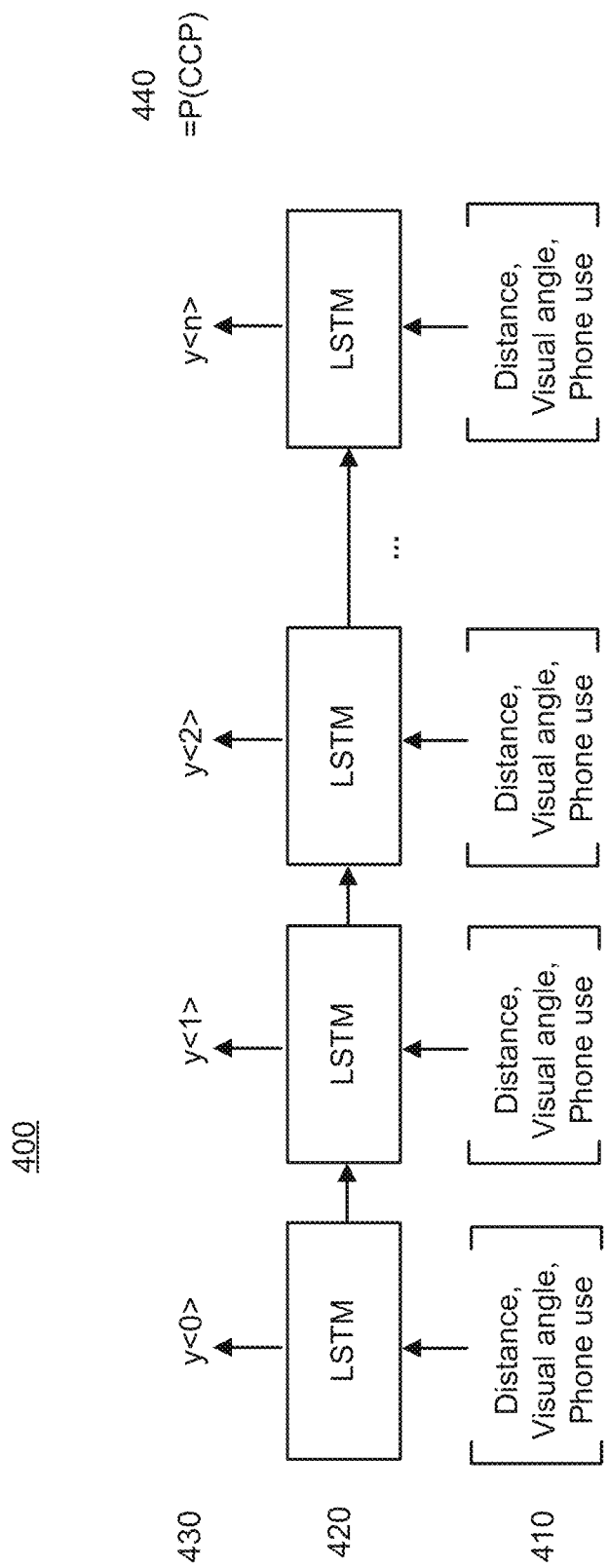
FIG. 4 depicts one embodiment of a deep learning approach for determining a probability that a VRU will exhibit a behavior.

FIG. 4 depicts one embodiment of a deep learning approach for determining a probability that a VRU will exhibit a behavior. The activity depicted in FIG. 4 is continuing a current path; however, any other activity may be used in place of continuing a current path. As shown in FIG. 4, input 410 is a vector of multiple features of a VRU at each frame. Examples of features of each such vectors includes, as depicted, Phone Usage, Gaze Estimation, Body Orientation, Pose Estimation. Any other feature or activity of a VRU may be included in input 410 despite not being depicted here.

The inputs X are input into deep LSTM network 420, each LSTM outputting respective probabilities 430 (each LSTM's individual probability is shown as probability Y in FIG. 4. Y is a confidence value for distraction. Distraction module 222 obtains the confidence value for distraction by combining some or all of the features shown in input 410 (e.g., 'tracking of pedestrian', 'gaze estimation' and 'phone use detection'). Further discussion of how confidence values are computed are described in further detail below with respect to confidence score determination module 225. Y is a probability value and not an exact value because the systems are noisy (so it is safer to work with probabilities). Deep LSTM network 420, (many-to-many) receives this probability value of "distraction" as ground truth. X is fed into Deep LSTM network 420, which then learns a mapping from X to Y through a latent representation of the multidimensional time series. Other inputs to the LSTM are also within scope of this disclosure.

Deep LSTM model 400 allows the system to make predictions about the probability of a pedestrian being distracted in the future, which infers that a pedestrian will exhibit a behavior (in the example of FIG. 4, continue current path): Continue Current Path=P(CCP) 440. When comparing the output of multiple features over both normal and critical situation data, current path module 222 is able to define which feature combinations are important to estimate P(CCP) 440. Current path module 222 may output P(CCP) 440 to a control system, where the control system may perform activity based on the output. For example, where P(CCP) 440 indicates that a VRU will be in the path of a vehicle, the control system may combine the previously calculated P(CCP) 440 with the vehicle behavior (e.g. predicted path of the vehicle) to determine whether the vehicle should alter its path. The control system may operate similarly based on probability predicted for any given behavior.

Deep LSTM model 400 ensures that crucial information that occurred earlier in the time series is not forgotten by performing its analysis on data derived from successive images and feeding the output Y forward along the network. In an embodiment, attentional mechanisms may be used in order to give higher weights to particular events. An example of this is that when current path module 222 is calculating P(CCP) with an visual angle (e.g., an angle of camera 110 relative to VRU 310) as an input. Deep LSTM network 400 would learn—by itself—that a person is less risky when they look at the vehicle (e.g., because the VRU is aware of the vehicle's presence), thus applying more weight to whether someone is looking at the vehicle.

In an embodiment, the output of deep LSTM model 400 feeds into a control system such as a decision-making module of a vehicle, such as an autonomous vehicle. For example, the decision-making module may have thresholds corresponding to LSTM outputs, such confidence values. Confidence values in each tier (e.g., 90-100% probability of distraction versus 50-60% chance of distraction) may be mapped to different reactions (e.g., stop vehicle versus slow vehicle to 5 kph or sound a horn). LSTM outputs may be monitored over an arc of time, so that the vehicle continually adapts its behavior as the confidence values change (e.g., after honking a horn, the LSTM takes the horn honk as a feature of input 410, and outputs a high confidence that the user is not distracted, so normal vehicle heading is resumed).

An example advantage of the deep learning approach is that if there is enough labeled (ground truth) data of the input and output features, it may be the most promising approach to get high accuracy. An example disadvantage of using the deep learning approach alone is that it is a black box. A human observer will not understand its decision making and the contribution and interaction of each individual feature of each image. This means that a human observer will not know which features are relevant, when the deep learning model 400 fails, or when the deep learning model 400 is biased. The network might also not learn infrequent feature combinations (e.g., a backwards walking pedestrian), which may crucial in driving context. Lastly, the model has millions of parameters, making it very slow and difficult to get working in real time.

Moving on to the Probabilistic Graphical Model (PGM) approach, PGMs include nodes (random variables) and edges (relations between the random variables). There are 2 types of PGMs, Markov network and Bayesian network (e.g., also called Belief Network). A Markov network is a non-directed graph and a Bayesian network is a directed graph (e.g., directed acyclic graph). In some embodiments of the disclosure, Bayesian networks are implemented, as it is likely that the features influence each other unidirectionally. Bayes networks model the joint distribution by decomposing it into factors (which are priors and conditional probabilities) from which posterior probabilities can be obtained. This is shown in more detail in FIG. 5.

Figure 5:
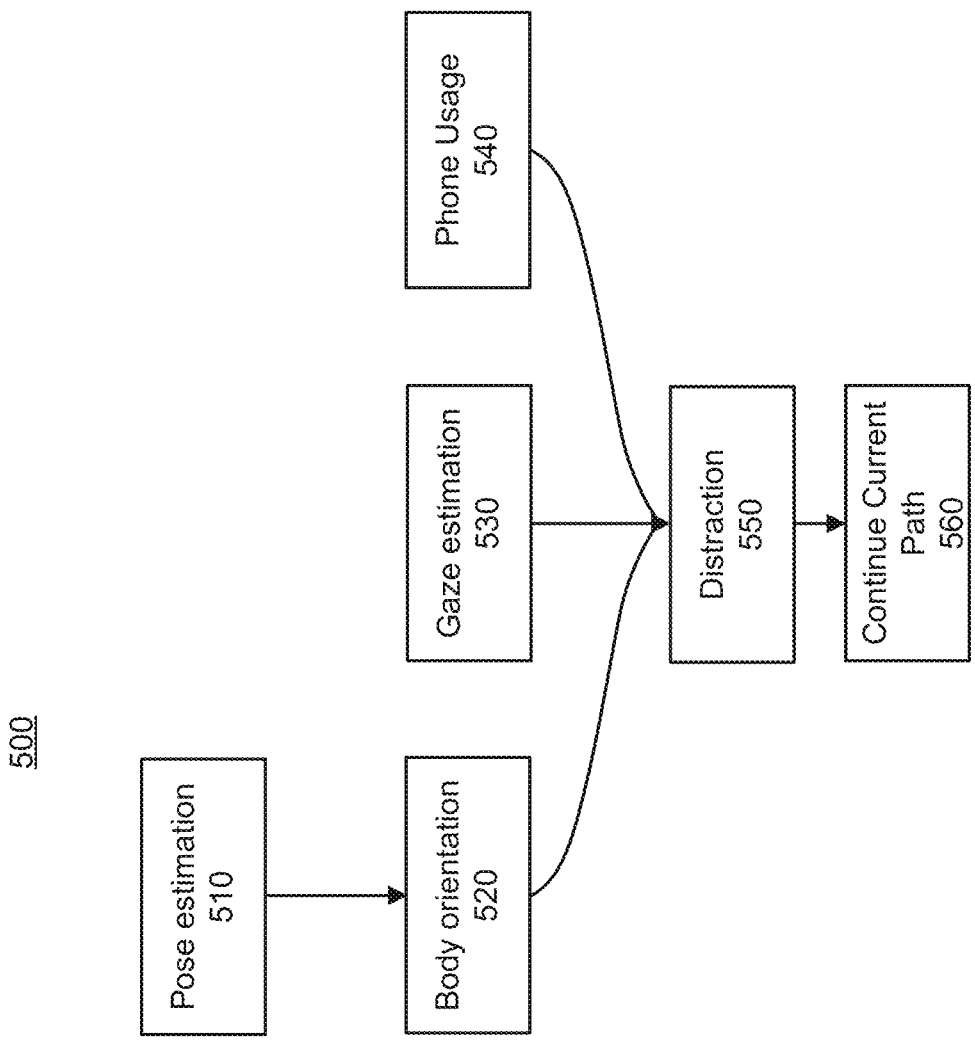
FIG. 5 depicts one embodiment of a data flow for determining a probability that a VRU will exhibit a behavior using a probabilistic graphical model.

FIG. 5 depicts one embodiment of a data flow for determining a probability that a VRU will perform an activity using a probabilistic graphical model. Again, FIG. 5 uses features that affect a prediction of continuing a current path as an illustrative example; however, any other behavior referred to herein may be predicted through a similar mechanism. As shown in FIG. 5, the factors of Bayesian network 500 include pose estimation 510, body orientation 520, gaze estimation 530, phone usage 540, distraction 550, and continue current path 560. These factors are merely exemplary, and any factors may be used. As depicted, pose estimation 510 directly influences body orientation 520. Gaze estimation 530 and phone usage 540, together with body orientation 520, directly influence distraction 550. Distraction 550 directly influences continue current path 560. Bayesian network 500 may be a static network. The factors described with respect to FIG. 5 each correspond to different possible states of the VRU.

The joint probability distribution P(CCP|D, PU, GE, BO, PE)) can be factorized to P(CCP|D)*P(D|PU, GE, BO)*P(BO|PE)*P(GE)*P(PE)*P(PU), where: CCP=Continue Current Path, D=Distraction, PU=Phone Usage, GE=Gaze Estimation, BO=Body Orientation, and PE=Pose Estimation. This factorization demonstrates how each factor influences P(CCP).

In some situations, there are conditional independencies between the features. Interdependency module 223 determines whether a value of a feature corresponds to a high confidence in a downstream feature. For example, interdependency module 223 compares a confidence value corresponding to the downstream feature to a threshold, and where the confidence value meets and/or exceeds the threshold, interdependency module 223 determines that the value of the feature corresponds to a high confidence of that downstream feature. Responsive to determining that the value of the feature corresponds to a high confidence in a downstream feature, interdependency model 224 identifies a conditional independency and eliminates other features that influence the downstream feature from consideration. For example, following from the discussion of FIG. 5, interdependency module 223 may determine that Gaze Estimation has a high confidence in 'Distraction', and may responsively determine that Body Orientation and Phone Usage have become irrelevant, as is shown in the following expression: P(CCP|D, PU, GE, BO, PE)=P(CCP|D, GE). This results in a huge reduction of parameters, thereby dramatically improving efficiency of the model. The conditional independencies may be determined by expert knowledge (e.g., as used to establish the thresholds). Alternatively or additionally, the conditional independencies may be determined by automatically comparing the performance of different set ups (for example through random assignment of connections between variables). While interdependencies are explained here with respect to continuing a current path, this is merely exemplary, and may be used to predict any behavior of a VRU.

Similar to the LSTM model, as depicted in FIG. 4, outputs of PGMs may be used by control systems, such as decision making modules of vehicles, to determine, for example, whether to alter a current path or heading or to continue with the status quo. PGM outputs may be monitored over a period of time so that a control system can update the course of the vehicle as a pedestrian's distractedness level changes.

In a Bayesian Network, there are parameters that may benefit from being updated at particular moments, e.g., by updating the estimate of the current position by conditioning it on the previous positions, a motion model, and several latent variables. However, there are also parameters that can be estimated online. For instance, the variance produced by measurement noise that relates the real 'hidden' position with the measure position of a pedestrian. Various algorithms may be used to perform these estimations. For example, there are algorithms that are extremely precise (exact inference, Markov Chain Monte Carlo), and there are approximations which are less exact but faster (e.g., variational inference, assumed density filtering).

Depending on whether the probability distribution of the variable in question is assumed to change by the upcoming observation, current path module 222 may use one or both of those online or offline inference algorithms. Offline approximation algorithms are the ones just mentioned like MCMC and Variational Inference. Offline inference is conducted during training of the model from a training set. It is therefore also called learning. When confronted with new observations during test time (e.g., during driving), in order to make predictions, current path module 222 applies online inference, which is a very quick way to sample from the model distributions in order to get a reliable estimate in real-time (e.g., through assumed density filtering, particle filtering). Current path module 222 is merely exemplary, and may be replaced or augmented by modules specific to predicting whether a VRU will exhibit behaviors different from continuing a current path.

While FIG. 5 describes a static network, dynamic PGMs may alternatively or additionally be used. Static networks look at the features we can currently observe (for example determining someone's distraction index at that moment, based on whether someone has a cell phone in their hands and their gaze estimation). Dynamic networks have features that influence themselves and other features in the future (for example predicting whether someone is distracted, which is influenced by 'body orientation', 'gaze estimation' and 'phone usage'). Moreover, the variables in dynamic networks influence each other over time (e.g. where pedestrians are looking is influenced by where they had looked before). To address dynamic PGMs, the systems and methods disclosed herein implement Dynamic Bayesian Networks, Markov Models, Hidden Markov Models and extended Kalman filters. For parameter estimation for the joint probability distribution we will use variational inference and Monte Carlo Markov chain. This is described further with reference to FIG. 6.

Figure 6:
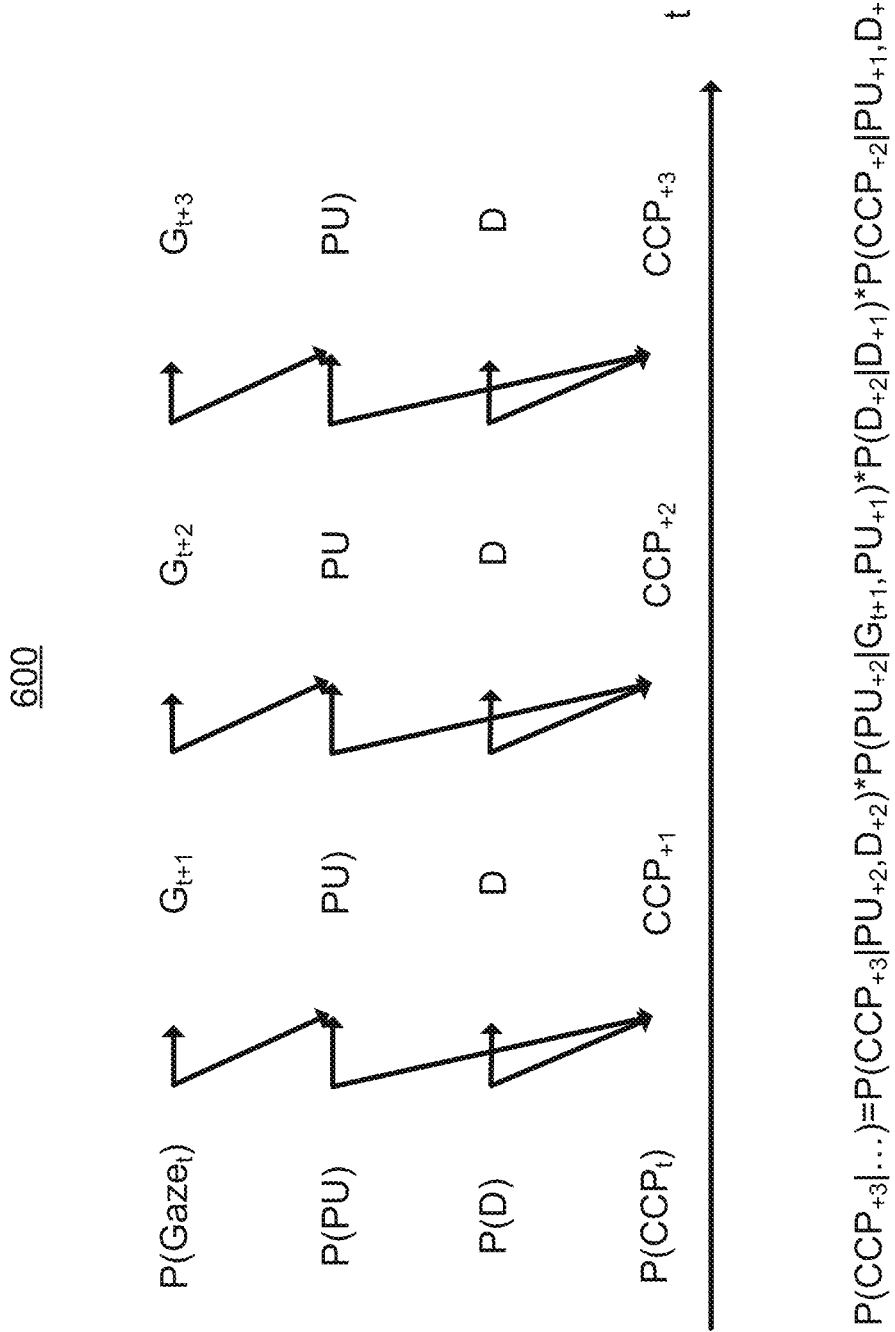
FIG. 6 depicts one embodiment of an example of features being combined in a framework of a dynamic Bayesian network.

FIG. 6 depicts one embodiment of an example of features being combined in a framework of a dynamic Bayesian network. Like the PGM described with reference to FIG. 5, Bayesian Network 600 models the temporal dependencies between features and can therefore be used for predictions. The arrows shown illustrate variables that upstream variables may influence. Going from left to right, the arrows show predictions for features of future sequential images at subsequent times, where prior features influence future features. This is expressed in terms of an exemplary factorization below the illustration of the dynamic Bayesian network.

In some embodiments, model selection module 224 determines that it is advantageous to implement a dynamic PGM (instead of a LSTM, or a static PGM, as described above). For example, the advantages of using a dynamic PHM include the fact that that the system has knowledge of the model (through a directed graph, like the one shown in FIG. 6) and a constraint of conditional independencies, which reduces the parameter space (e.g., because some parameters have become irrelevant due to the interdependencies, as described above). The system selects the best of the several competing graph structures. It is easier to interpret the decision, and when individual features are not recognizable it does not limit the overall model to perform.

Based on the amount of labeled data and the task complexity, model selection module 224 determines whether to apply an LSTM, Dynamic Probabilistic Graphical Model or combination of the two. To maximize advantageous implementation, in some embodiments, the dynamic PGM may be used in scenarios where there are discrete variables. Furthermore, in some embodiments, the condition probabilities for dynamic models are linearly approximated when continuous variables are used. Again, regardless of method, the outputs of the dynamic PGM drive decision making by, e.g., an autonomous vehicle to continue making reactive decisions based on confidence of human activity or distractedness.

A range of algorithms may be used to decide whether to use a deep learning or PGM approach automatically, such as a grid search, and/or Bayesian optimization algorithms to tune hyperparameters to automatically search for the best model. VRU movement predictor 130 may then use the prediction accuracy to determine which one performs best. In some embodiments, to determine which outcome is better, VRU movement predictor 130 may compare accuracy of the predictions of different models and model configurations are on different validation test sets and use the model that performed more accurately on test sets that resemble the current scenario. In an embodiment, VRU movement predictor may use generative approaches by generating data from both PGM and neural network, and comparing that to real world data. Using the posterior predictive check, VRU movement predictor 130 may generate data and see how similar it is. In some embodiments, VRU movement predictor 130 may use a likelihood ratio test, which can be used where there are two models, with different complexities. They each output a value for how well they fit the data. If a given model can predict the same quality with fewer parameters, VRU movement predictor 130 will select that model because it will likely overfit less. In some embodiments, VRU movement predictor 130 may, for each parameter, generate a significance value to determine how well they contribute to the final outcome. In some embodiments, to make an exploratory analysis and to see if there are relations between the variables. Whether they are complex (non-linear) or not, VRU movement predictor 130 may determine which approach works better and whether a certain parameter is relevant to include or not.

In most Bayesian networks, variables are discrete and conditional probabilities are represented by tables of possible combinations. An example is the discretization of the distraction prediction probability, shown in Table 1 below, following $P(D_{dich}|GE_{dich}, PU_{dich})$, where "dich" means that the variables are made binary (1 or 0):

TABLE 1

|  | CCP = 1 | CCP = 0 |
| --- | --- | --- |
| GE = 1, PU = 1 | 0.2 | 0.8 |
| GE = 1, PU = 0 | 0.01 | 0.99 |
| GE = 0, PU = 1 | 0.5 | 0.5 |
| GE = 0, PU = 0 | 0.2 | 0.8 |

Where discretization is used, continue current path module 222 is able to thus lead to output either that a VRU is, or is not, going to continue a current path using binary outputs. These binary outputs may be coupled with levels of confidence that indicate how likely the output is to be accurate. Again, CCP, GE, and PU are merely exemplary, and other behaviors may be predicted in place of CCP, based on other features.

While probabilistic and deep learning models were discussed above as separate options, hybrid models that take advantage of all options may be used. For example, for continuous variables or multi-dimensional variables, more flexible representations for conditional probabilities in Bayesian networks are implemented. Combining neural networks and Bayesian Networks in a PGM allows for the modelling of nonlinear conditional probabilities of continuous variables. This is as robust and flexible as neural networks but still provides information about uncertainty and the capability to insert physically plausible relations between the variables.

A probabilistic graphical model is a general framework for building any model in a probabilistic manner. Model selection module 224 can combine interpretable variables that affect each other into one direction (causality), by building conditional probability functions. Those functions are usually very simple models, and during model learning, the goal is to estimate those parameters. This can be achieved by exact inference algorithms (e.g, variable elimination, clique tree algorithms). However, when the model becomes more complex, to estimate the posterior distribution over a variable given its parents may become intractable. In such embodiments, model selection module 224 may use approximation algorithms to estimate the parameters, such as Markov Chain Monte Carlo (MCMC). However, a shortcoming of MCMC is that it is extremely slow, and when models become too large (for example with deep learning), those algorithms might not converge quickly, or even within a lifetime.

Therefore, highly parameterized models like deep neural networks are usually not implemented within the probabilistic graphical model framework. Instead of estimating a probability distribution over parameters, deep neural networks use maximum likelihood estimation that make point estimates of the parameters. Point estimates prevent the possibility to obtain proper estimates of model uncertainty during test time. Nevertheless, more recently, faster inference algorithms were developed that can approximate the posterior distribution over parameters by proposing simpler distributions and use optimization to decrease the KL divergence between the true posterior distribution and the simpler proposal distribution. This turns the inference into an optimization problem, for which the Variational Inference algorithm is used to build the Variational Auto-Encoder, which is currently the most popular example where probabilistic graphical models integrate deep neural networks. However, if it is desirable to make fast predictions at test time, model selection module 224 may use faster algorithms and/or may build smaller models.

By imposing conditional independencies, model selection module 224 decreases the size of the model to make real-time predictions possible. Concretely, model selection module 224 may use a Bayes network as described above and replace the conditional distribution function with neural networks. This increases the number of parameters but those are still by far fewer parameters than using a fully connected neural network. This makes the PGM much more flexible while still providing uncertainty estimates and the power to use expert knowledge to define the relations between the variables in the model.

Figure 7:
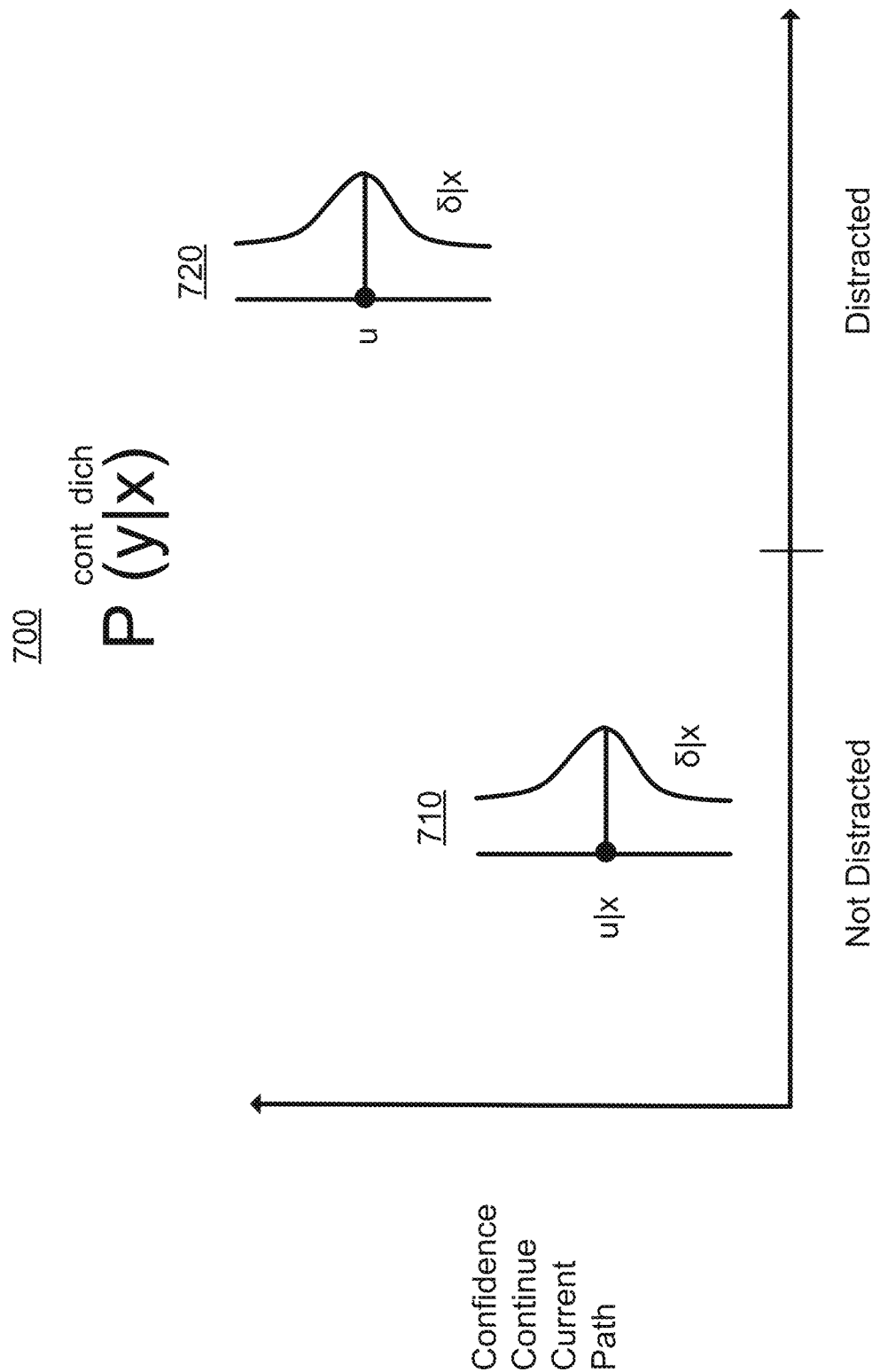
FIG. 7 depicts an exemplary embodiment for determining a curves used to determine confidence that a VRU will exhibit a behavior.

For instance, based on an assumption that the conditional probability P(Y|X) follows a gaussian function, and X and Y are continuous, VRU movement predictor 130 estimates the mu_y and sigma_y for each X value through neural nets. In some embodiments, this can also be a gaussian mixture model with multiple mu, sigmas, and covariances. This can be further understood with reference to FIG. 7. FIG. 7 depicts an exemplary embodiment for determining curves used to determine confidence that a VRU will perform an activity. Again, like all other examples, this is depicted with regard to a VRU continuing a current path, though this may be generalized to determine a confidence that a VRU will exhibit any behavior. In an embodiment where X is binary (distracted versus not distracted), VRU movement predictor 130 relates orientation to another continuous variable, e.g. continue current path, using a neural network that estimates the mean and standard deviation conditioned to the X class. Confidence score determination module 225 determines the confidence of each particular determination based on the spread of the distribution. That is, confidence score determination module 225 may compute the confidence score for a particular probability of continuing a current path based on the size of the spread, the standard deviation, the mean, and/or any other statistical information of the curve, where a large spread corresponds to a high degree of uncertainty, and a small spread corresponds to a low degree of uncertainty. For example, curve 710 indicates probabilities that a VRU is not distracted, and curve 720 indicates probabilities that a VRU is distracted. In this example, whether the VRU will continue its current path is predicted based on whether the VRU is distracted, and the confidence will depend on the spread of curves 710 and/or 720. Again, distraction is an exemplary factor in determining whether a VRU will continue its current path, and any other feature may be used to predict this behavior or any other behavior.

Figure 8:
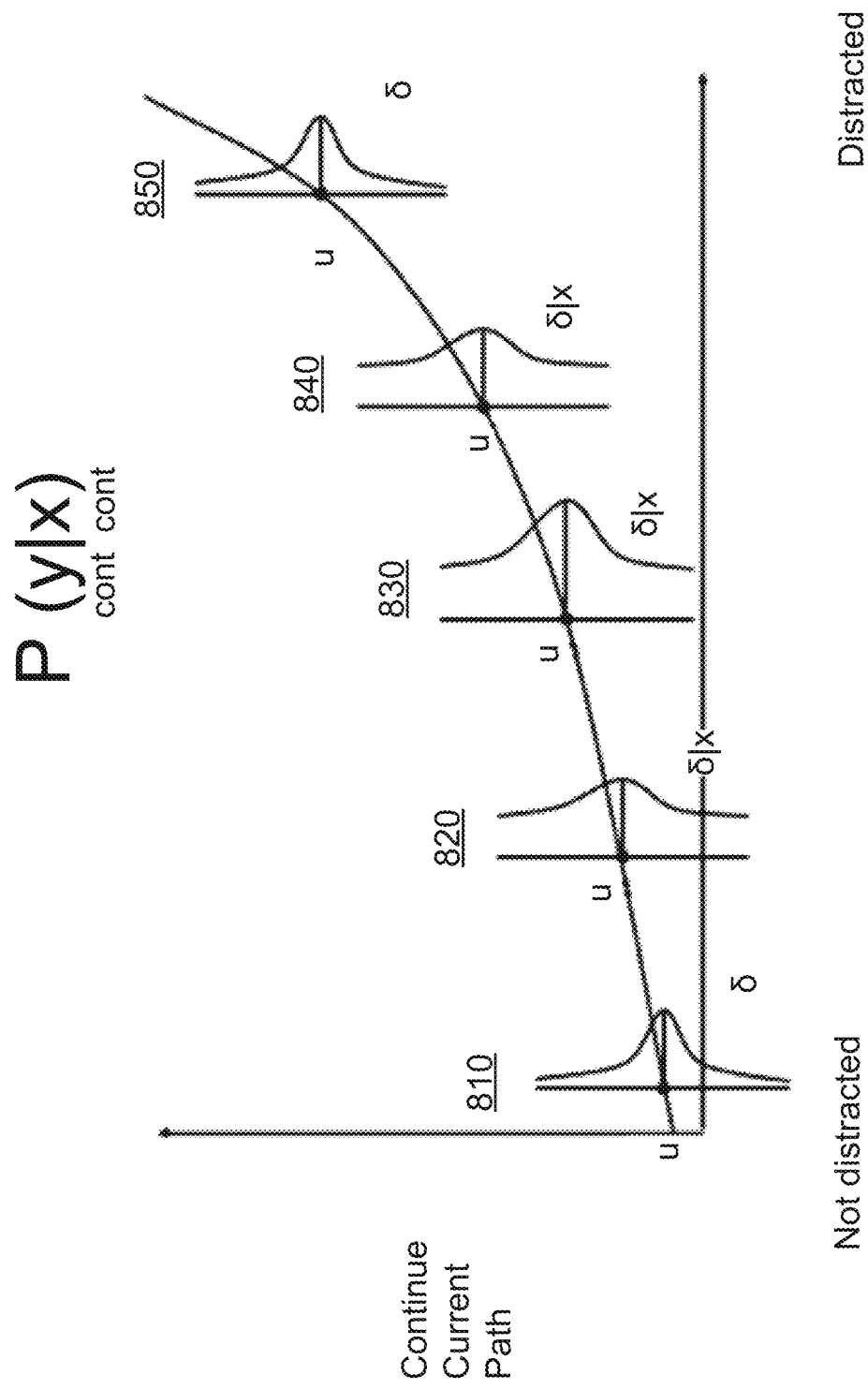
FIG. 8 depicts another exemplary embodiment for determining a confidence that a VRU will exhibit a behavior.

In some embodiments, the relation between different variables is complex and non-linear. In such scenarios, model selection module 224 selects neural networks for use in the model. In such embodiments, for different variables, different feature models may have different confidences. This is exemplified in FIG. 8. FIG. 8 depicts another exemplary embodiment for determining a confidence that a VRU will exhibit a behavior. Again, the use in FIG. 8 of distraction and continuing a current path is merely exemplary, and any feature and behavior may be used. As shown in FIG. 8, when someone is between not distracted and distracted (curves 820, 830, and 840), confidence score determination module 225 computes less confidence in whether they are going to continue in their current path. When someone is determined to be distracted or not distracted, confidence score determination module 225 computes more confidence in whether they are going to continue in their current path (e.g., curves 810 and 850). This is because the middle probability curves show wide curves relative to those where a user is predicted to be distracted or not distracted (which show narrow curves). Current path module 222 may then model this uncertainty into the neural network.

Figure 9:
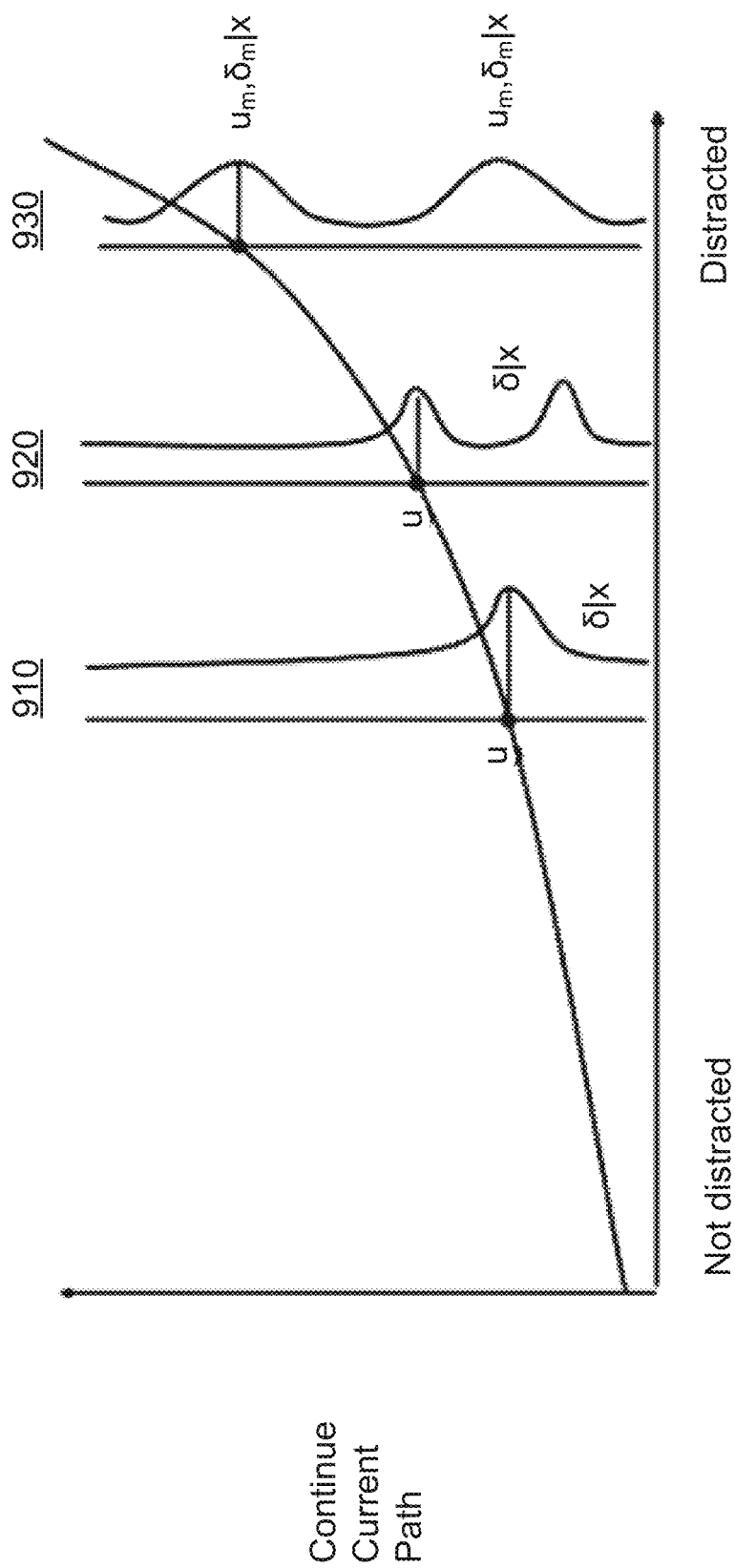
FIG. 9 depicts another exemplary embodiment for determining a confidence that a VRU will exhibit a behavior.

FIG. 9 depicts another exemplary embodiment for determining a confidence that a VRU will perform an activity. Again, the use in FIG. 8 of distraction and continuing a current path is merely exemplary, and any feature and behavior may be used. In some embodiments, the system models the P(CCP) as a continuous variable by relating it to distraction, as depicted in FIG. 9. As can be seen in FIG. 9, such distraction might lead to a higher P(CCP) when someone is distracted (curves 930), and a very low P(CCP) when someone is not distracted (curves 910 and 920), because there is a higher awareness of the car where the person is not distracted. In an embodiment where the system excludes distraction as a parameter, this may lead to a multimodal gaussian distribution with two mu's (means of the normal distribution) and two sd's (standard deviations).

VRU Movement Predictor 130 may combine multiple features and latent variables within a generative model (a probabilistic graphical model). In contrast to discriminative models (like neural networks or support vector machines), a generative model estimates the joint probability distribution of all involved variables and makes predictions by using Bayes rule to obtain conditional probabilities. A discriminative model captures the conditional probability distribution directly. Using generative models brings various advantages and a few disadvantages. Some exemplary advantages include: a) VRU movement predictor 130 can use expert knowledge, b) VRU movement predictor 130 can specify causal relations between the variables, c) the variables are interpretable, d) VRU movement predictor 130 can provide outputs to a human being that are understandable as to how the algorithm makes its decisions, e) VRU movement predictor 130 can use prior knowledge, and f) VRU movement predictor 130 can capture uncertainty in variables, parameters, and predictions.

Moreover, where VRU movement predictor 130 captures the correct causal relationships, generative models are generalizable to other domains (more robust to domain shifts). That is, for example, VRU movement predictor 130 may be used where different cultural norms that govern pedestrian patterns are performed and will still be successful. Particularly PGMs (a type of generative model) are powerful tools if we have sufficient expert knowledge because we can bias the model according to our world view, which is an advantage as long as those biases are correct.

On the other hand, discriminative models (particularly deep neural networks) are a) very powerful in approximating complex functions, b) there are available very efficient training algorithms for those models, c) they are easier to fit, and d) such models usually achieve higher accuracies (are less biased) than generative models if we have a sufficient amount of data for the problem at hand.

The hybrid model described herein combines both approaches. In such embodiments, VRU movement predictor 130 uses a PGM as a base model. VRU movement predictor 130 includes memory where an administrator provides for instance the particular causal relations and probability distributions between head orientation, phone use, past motion history, and distraction and intention to cross. At test time the administrator may obtain a probability distribution for the probability of distraction or intention to cross by computing their conditional probabilities given all its parents variables. Usually, simple distributions such as normal distribution, gamma distribution, beta distribution, etc. are used (depending on the particular attributes of the variable). However, in order to achieve more flexibility, the conditional probability distributions can be replaced by neural networks with an arbitrary number of nodes and layers. Therefore, the combination leverages the advantages of both generative and discriminative models.

Figure 10:
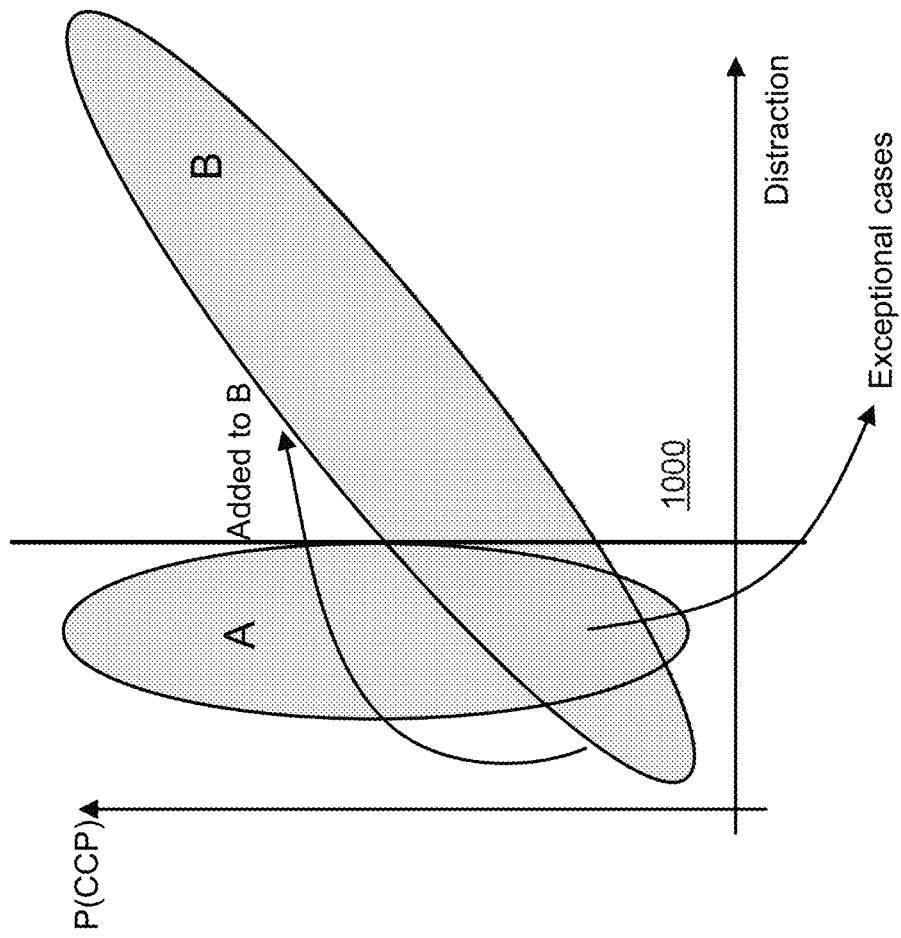
FIG. 10 depicts one embodiment depicting a manner of detecting exceptional cases.

To give a concrete example of the advantage of using this hybrid version, consider edge case detection, where the hybrid model is able to detect exceptional cases. FIG. 10 depicts one embodiment depicting a manner of detecting exceptional cases. With reference to FIG. 10, a normal deep learning approach would separate A and B using the vertical line 1000. The Hybrid model would determine that the part of B on the left of vertical line 1000 belongs to that collection of behaviors. While a neural network learns a direct mapping from the input space to the output (e.g., class labels) and estimates the parameters of a decision boundary from the labels (see vertical black line in FIG. 10), the hybrid approach is generative in nature, and thus models the distributions that have generated the data. The hybrid model therefore learns how the data for the different classes looks. In FIG. 10, for example, two normal distributions are used as underlying distributions, each belonging to a different class. By knowing the parameters of those distributions, the hybrid model is able to provide the probability of the left most point in FIG. 10 to belong to a particular model (class). Although it receives low probability to belong to any of those models (it is an edge case), with the hybrid model the system decides correctly that it belongs to the normal distributions that has the mean to the right of the decision boundary of the neural network (vertical line). Thus, the overlap of exceptional cases would also be detected, allowing VRU movement detector 130 to gather more data to identify that specific behavior.

Figure 11:
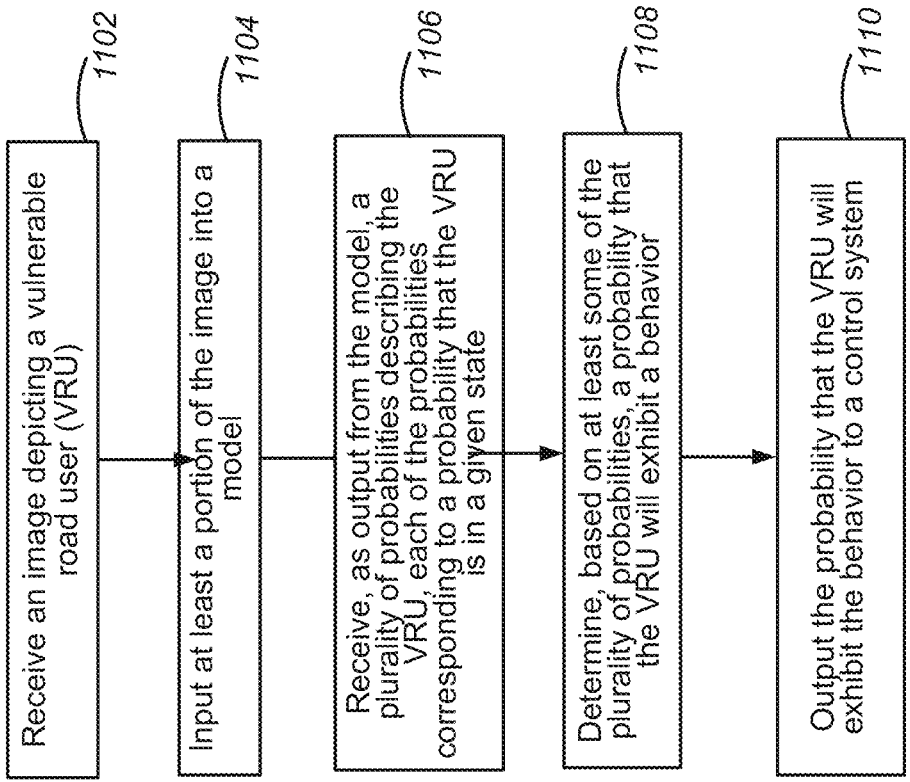
FIG. 11 depicts an exemplary data flow for determining a probability that a VRU will exhibit a behavior.

FIG. 11 depicts an exemplary data flow for determining a probability that a VRU will continue a current path. Process 1100 begins with VRU movement predictor 130 receiving 1102 an image depicting a vulnerable road user (VRU) (e.g., using image receipt module 221). VRU movement predictor inputs 1104 at least a portion of the image into a model (e.g., a deep learning model, a static or dynamic PGM, or a hybrid model as retrieved from candidate models database 231). VRU movement predictor 130 receives 1106, as output from the model, a plurality of probabilities describing the VRU, each of the probabilities corresponding to a probability that the VRU is in a given state.

VRU movement predictor 130 determines 1108, based on at least some of the plurality of probabilities, a probability that the VRU will continue on a current path. In an embodiment, the probability that the VRU will continue on a current path depends on a probability that the VRU is distracted. VRU movement predictor 130 outputs 1110 the probability that the VRU will continue on the current path to a control system.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving a plurality of sequential images comprising a first image depicting a vulnerable road user (VRU) captured at a first time and a second image depicting the VRU captured at a second time later than the first time;
    inputting at least a portion of the first image into a model;
    receiving, as output from the model, a plurality of probabilities describing the VRU, each of the probabilities corresponding to a probability for each of a plurality of variable features corresponding to different states of the VRU, wherein the model comprises a hybrid model including one or more conditional probability functions approximated by neural networks corresponding to variable features of the model, and a probabilistic graphical model defining relations between the variable features;
    inputting the plurality of probabilities describing the VRU and the second image into the model and receiving, as output from the model, a confidence value that the VRU will exhibit a behavior; and
    outputting the confidence value that the VRU will exhibit the behavior to a vehicle control system, wherein the vehicle control system causes a vehicle to alter its path based on the confidence value.

2. The method of claim 1, wherein the behavior is the VRU continuing on a current path, and wherein the method further comprises:
    determining, based on at least two or more of the plurality of probabilities, a probability that the VRU is distracted, wherein determining the probability that the VRU will continue on the current path is based on the probability that the VRU is distracted.

3. The method of claim 2, wherein determining, based on at least two or more of the plurality of probabilities, the probability that the VRU is distracted comprises:
    determining that a given probability of the plurality of probabilities has a conditional independency, where the given probability exceeds a threshold; and
    responsive to determining that the given probability exceeds the threshold, determining the probability that the VRU is distracted by using the given probability to an exclusion of at least one other probability of the plurality of probabilities.

4. The method of claim 3, further comprising:
    determining the at least one other probability of the plurality of probabilities that is excluded based on a data structure that defines the conditional independency.

5. The method of claim 1, wherein the model is a probabilistic graphical model.

6. The method of claim 4, wherein the probabilistic graphical model is at least one of a Markov network and a Bayesian network.

7. The method of claim 1, further comprising:
    determining a confidence score corresponding to the probability; and outputting the confidence score to the control system with the probability that the VRU will exhibit the behavior.

8. The method of claim 7, wherein the probability that the VRU will exhibit the behavior is determined based on a posterior predictive distribution of possible outcomes, and wherein the confidence score is determined based on a spread of the posterior predictive distribution.

9. The method of claim 7, wherein the control system receives a command based on the probability, and wherein the control system determines whether to disregard the command based on the confidence score.

10. The method of claim 1, wherein the model is either a neural network or a probabilistic graphical model.

11. The method of claim 10, further comprising:
determining which of a neural network or a probabilistic graphical model will yield a better accuracy of the output; and
selecting the model to be, of the neural network and the probabilistic graphical model, the one that will yield the better accuracy of the output.

12. The method of claim 1, wherein the model is applicable in a plurality of domains without a need for domain-specific training data.

13. A non-transitory computer-readable medium comprising memory with instructions encoded thereon, the instructions causing one or more processors to perform operations when executed, the instructions comprising instructions to:
receive a plurality of sequential images comprising a first image depicting a vulnerable road user (VRU) captured at a first time and a second image depicting the VRU captured at a second time later than the first time;
input at least a portion of the first image into a model;
receive, as output from the model, a plurality of probabilities describing the VRU, each of the probabilities corresponding to a probability for each of a plurality of variable features corresponding to different states of the VRU, wherein the model comprises a hybrid model including one or more conditional probability functions approximated by neural networks corresponding to variable features of the model, and a probabilistic graphical model defining relations between the variable features, wherein the model is trained at least in part to predict whether a given VRU will exhibit a given behavior using example images as labeled with state information;
input the plurality of probabilities describing the VRU and the second image into the model and receiving, as output from the model, a confidence value that the VRU will exhibit a behavior; and
output the confidence value that the VRU will exhibit the behavior to a control system.

14. The non-transitory computer-readable medium of claim 13, wherein the behavior is the VRU continuing on a current path, and wherein the instructions further comprise instructions to determine, based on at least two or more of the plurality of probabilities, a probability that the VRU is distracted, wherein determining the probability that the VRU will continue on the current path is based on the probability that the VRU is distracted.

15. The non-transitory computer-readable medium of claim 14, wherein the instructions to determine, based on at least two or more of the plurality of probabilities, the probability that the VRU is distracted comprise instructions to:
determine that a given probability of the plurality of probabilities has a conditional independency, where the given probability exceeds a threshold; and
responsive to determining that the given probability exceeds the threshold, determine the probability that the VRU is distracted by using the given probability to an exclusion of at least one other probability of the plurality of probabilities.

16. The non-transitory computer-readable medium of claim 15, wherein the instructions further comprise instructions to determine the at least one other probability of the plurality of probabilities that is excluded based on a data structure that defines the conditional independency.

17. A system comprising:
memory with instructions encoded thereon; and
one or more processors that, when executing the instructions, are caused to perform operations comprising:
receiving a plurality of sequential images comprising a first image depicting a vulnerable road user (VRU) captured at a first time and a second image depicting the VRU captured at a second time later than the first time;
inputting at least a portion of the first image into a model;
receiving, as output from the model, a plurality of probabilities describing the VRU, each of the probabilities corresponding to a probability for each of a plurality of variable features corresponding to different states of the VRU, wherein the model comprises a hybrid model including one or more conditional probability functions approximated by neural networks corresponding to variable features of the model, and a probabilistic graphical model defining relations between the variable features;
inputting the plurality of probabilities describing the VRU and the second image into the model and receiving, as output from the model, a confidence value that the VRU will exhibit a behavior; and
outputting the confidence value that the VRU will exhibit the behavior to a control system.

18. The system of claim 17, the operations further comprising:
determining a confidence score corresponding to the probability; and
outputting the confidence score to the control system with the probability that the VRU will exhibit the behavior.

19. The system of claim 18, wherein the probability that the VRU will exhibit the behavior is determined based on a posterior predictive distribution of possible outcomes, and wherein the confidence score is determined based on a spread of the posterior predictive distribution.

20. The system of claim 18, wherein the control system receives a command based on the probability, and wherein the control system determines whether to disregard the command based on the confidence score.

* * * * *